US009568703B2

United States Patent
Nagano (10) Patent No.: US 9,568,703 B2
(45) Date of Patent: Feb. 14, 2017

(54) IMAGE READING LENS, IMAGE READING DEVICE, AND IMAGE FORMING APPARATUS

(71) Applicant: Takuya Nagano, Kanagawa (JP)

(72) Inventor: Takuya Nagano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/979,676

(22) Filed: Dec. 28, 2015

(65) Prior Publication Data

US 2016/0202444 A1    Jul. 14, 2016

(30) Foreign Application Priority Data

Jan. 9, 2015   (JP) .................................. 2015-003707

(51) Int. Cl.

| G02B 7/00 | (2006.01) |
| G02B 7/02 | (2006.01) |
| G02B 9/62 | (2006.01) |
| H04N 1/00 | (2006.01) |
| G02B 27/00 | (2006.01) |
| G02B 13/00 | (2006.01) |

(52) U.S. Cl.
CPC .................. *G02B 7/028* (2013.01); *G02B 9/62* (2013.01); *G02B 13/0045* (2013.01); *G02B 27/0025* (2013.01); *H04N 1/00559* (2013.01); *H04N 1/00814* (2013.01)

(58) Field of Classification Search
CPC ......... G02B 13/009; G02B 7/028; G02B 9/62;
G02B 7/02; G02B 15/16; G02B 15/173;
G02B 27/0031; G02B 9/34; G02B 13/18;
G02B 13/04; G02B 13/0045; H04N
1/00559; H04N 1/00814; H04N
1/00; H04N 1/028; H04N 1/1935; H04N
9/317
USPC ................ 359/714, 753, 503, 680, 683, 687
See application file for complete search history.

(56) References Cited

U.S. PATENT DOCUMENTS

| 2014/0253983 A1 | 9/2014 | Nagano |
| 2014/0340544 A1* | 11/2014 | Kimura ................ G02B 13/009 359/683 |
| 2014/0347710 A1 | 11/2014 | Nagano |
| 2015/0212319 A1 | 7/2015 | Nagano |

FOREIGN PATENT DOCUMENTS

JP    2014-174415    9/2014

* cited by examiner

*Primary Examiner* — Euncha Cherry
(74) *Attorney, Agent, or Firm* — Oblon, McClelland, Maier & Neustadt, L.L.P.

(57) ABSTRACT

An image reading lens includes a plurality of lenses, a first correcting mechanism that corrects a field curvature at a first correction part when temperature changes, and a second correcting mechanism that corrects an image-forming position when the temperature changes. The second correcting mechanism corrects the image-forming position at a part where a positional displacement of the image-forming position caused by a change of a lens interval is greater and a variation of the field curvature caused by the change of the lens interval is smaller than the first correction part.

8 Claims, 5 Drawing Sheets

IMAGE READING LENS, IMAGE READING DEVICE, AND IMAGE FORMING APPARATUS

CROSS-REFERENCE TO RELATED APPLICATION

The present application is based on and claims priority to Japanese patent application No. 2015-003707, filed Jan. 9, 2015, the disclosure of which is hereby incorporated by reference herein in its entirety.

BACKGROUND

Technical Field

The present invention relates to an image reading device, such as an image scanner, and an image reading lens adapted to read an original image as a part of an image forming apparatus, such as a facsimile and a digital copying machine. Further, the present invention relates to an image forming apparatus including the image reading device.

Description of Related Art

Image reading devices, which are installed into image scanners, facsimiles, digital copying machines or the like to read original images, are configured to form reduced optical images using image reading lenses and to photograph the reduced optical images by solid-state image pickup elements (e.g., CCD image sensors) so as to make the images into electronic image data. Further, to read the original images as color images, the solid-state image pickup elements are configured with so-called three-line CCD image sensors having light-receiving elements arranged in three lines. Each of the light-receiving elements includes, for example, a red filter, a green filter, and a blue filter. By forming the reduced optical images of the original documents onto the light-receiving surfaces of the solid-state image pickup elements, the image reading devices perform color separation of the images into three primary colors and convert the color image data into signals. In general, the image reading lenses are required to have a high contrast in a high special frequency region on the image plane and a high aperture efficiency up to the periphery part of a viewing angle. Additionally, in order to appropriately read color original documents, the image-forming positions in the optical direction of the primary colors, i.e., red, green and yellow, on the light-receiving surfaces need to be identical to each other. That is, the chromatic aberration of each primary color needs to be corrected accurately.

On the other hand, in order to downsize the image reading devices and to accelerate image reading speed thereof, heating value in the vicinity of the photographing part such as the CCD image sensors increases. Further, in order to increase illuminance of light sources to illuminate the original images, the heating value of the light source also increases. As a result, the temperature inside the image reading device increases, and thus the performance of the devices may be deteriorated. Patent Literature 1 (JP2014-174415 A) discloses an image reading lens to restrain the deterioration of the performance caused by temperature changes.

SUMMARY

Although the image reading lens of Patent Literature 1 can correct the image-forming positions after temperature changes, the Patent Literature 1 is completely silent about variation of field curvatures. When driving the image pickup elements, temperature of and around the image pickup elements increases. Due to a difference of materials around the image pickup elements (i.e., a difference of the linear expansion coefficients around the elements), the image pickup elements are bent disadvantageously. Consequently, the performance of and periphery parts of the image pickup elements will be deteriorated.

In order to overcome such a deficiency, an object of the present invention is to provide a high-quality image reading lens that can correct not only the image-forming positions caused by temperature changes but also field curvatures also caused by temperature changes.

To achieve the above object, an aspect of the present invention provides an image reading lens including a first correcting mechanism that corrects a field curvature at a first correction part when temperature changes, and a second correcting mechanism that corrects an image-forming position when the temperature changes. The second correcting mechanism corrects the image-forming position at a part where a positional displacement of the image-forming position caused by a change of a lens interval is greater and a variation of the field curvature is smaller than the first correction part.

DETAILED DESCRIPTION

Hereinafter first to seventh embodiments of the present invention are described with reference to the drawings.

First, a fundamental structure of the present invention will be described. As explained above, the image reading lens of Patent Literature 1 can correct the image-forming positions if the shapes of the image pickup elements are maintained after the temperature change. However, the technique disclosed in Patent Literature 1 does not consider quality degradation caused by deflection of the image pickup elements. When driving the image pickup elements, temperature of and around the image pickup elements increases. Due to a difference of materials around the image pickup elements (i.e., a difference of the linear expansion coefficients around the elements), the image pickup elements are bent or deflected disadvantageously. Since the positions of the image pickup elements are shifted from the image-forming position, the performance of and around periphery parts of the image pickup elements will be deteriorated.

Therefore, the image reading lens according to an example of the present invention includes a first correcting mechanism that corrects a field curvature at a first correction part when temperature changes, and a second correcting mechanism that corrects an image-forming position when the temperature changes. The second correcting mechanism corrects the image-forming position at a part where a positional displacement of the image-forming position caused by a change of a lens interval is greater and a variation of the field curvature is smaller than the first correction part. By having the first correcting mechanism, it becomes possible to adjust the shapes of the field curvature when the temperature changes. Since the image pickup elements are configured with a plurality of materials, the image pickup elements are unavoidably bent or deflected when the temperature changes. However, by having the first correcting mechanism, it becomes possible to adjust the field curvature to compensate the deflection of the elements. As a result, it becomes possible to acquire high quality images up to periphery parts even when the temperature changes. Further, by having the second correcting mechanism, it becomes possible to adjust the image-forming position when the temperature changes. When the temperature inside the image reading device changes, the materials of the image reading lens expand or reduce and the refractive index changes. Further, holding members to hold the photographing part and the image reading lens may be thermally expanded by the heat at the photographing part, resulting a change of the positional relationship between the image-forming position of the image reading lens and the imaging surface. However, by having the second correcting mechanism, it becomes possible to adjust the image-forming position to follow the imaging surface when the temperature changes, resulting in acquiring high quality images up to the periphery parts.

Since the first and second correcting mechanisms have small influence against each other, they can perform the correction appropriately. Further, the image reading lens includes a front lens group on the object side and a rear lens group on the image side, the front lens group are held by two holding members, and the first correcting mechanism corrects the field curvature using the two holding members when the temperature changes. The movement of the lens interval (gap between the lenses) is determined in accordance with the linear expansion coefficients of the holding members. When the image reading lens is held by a single holding member, all lens intervals change in accordance with one linear expansion coefficient of the single holding member. Thereby, it is unable to correct the change of the lens intervals caused by the temperature change. That is, it is unable to adjust the field curvature caused by the temperature change. On the other hand, when the image reading lens is held by two holding members, it is possible to adjust the lens intervals at a divided section of the holding members when the temperature changes. Therefore, by dividing the image reading lens at an effective part to adjust the field curvature by lens intervals and by holding the image reading lens by the two holding members, it becomes possible to easily adjust the moving amounts of the lens intervals caused by the temperature change. Consequently, it can adjust the field curvature when the temperature changes.

By adjusting the lens intervals such that the change amount of the field curvature caused by the temperature change and the deflection amount of the image pickup elements caused by the temperature change become approximately equal, it becomes possible to acquire high quality images up to the periphery parts without causing a positional displacement. Further, the image reading lens according to an example of the present invention includes a member inserted between the two holding members, and the member has a different linear expansion coefficient from the two holding members. Accordingly, it becomes possible to further correct the field curvatures, resulting in high quality images. Since the member inserted between the holding members has a different linear expansion coefficient from the two holding members, it becomes possible to adjust the lens intervals at the divided section when the temperature changes. That is, the image reading lens can adjust the lens intervals with the thickness and the liner expansion coefficient of the member. Accordingly, by appropriately selecting the member such that the change amount of the field curvature caused by the temperature change and the deflection amount of the image pickup elements caused by the temperature change become approximately equal, it becomes possible to acquire high quality images up to the periphery parts without causing a positional displacement. Here, the linear expansion coefficients of the two holding members can be identical to each other.

When the two holding members are configured to have different linear expansion coefficients from each other, the image reading lens can correct the field curvatures more appropriately, thereby enabling of acquisition of high quality images. With the differences of the linear expansion coefficients, the image reading lens can adjust the change of the lens interval caused by the temperature change. By appropriately selecting the linear expansion coefficients of the members such that the change amount of the field curvature caused by the temperature change and the deflection amount of the image pickup elements caused by the temperature change become approximately equal, it becomes possible to achieve high image quality before and after the temperature change. Further, the image reading lens of an example of the present invention includes a mechanism (a fixed position adjusting mechanism) to adjust fixed positions of the front lens group and the rear lens group. With this, it becomes possible to correct the image-forming position in between the front lens group and the rear lens group when the temperature changes, resulting in acquiring high quality images even after the temperature change. Since the materials expand and reduce at the corresponding fixed positions when the temperature changes, the image reading lens is configured to include the mechanism to adjust the fixed positions of the front lens group and the rear lens group. Here, the change of the image-forming position in the front lens group is relatively large. With this, it can arbitrarily adjust the space between the front lens group and the rear lens group. Changing the space between the front lens group and the rear lens group can change the image-forming position. Therefore, by adjusting the fixed positions of the front lens group and the rear lens group, it becomes possible to prevent the positional relationship between the image-forming positions of the image reading lens and the imaging surface from shifting, thereby suppressing deterioration of the performance.

Note that the image reading lens may adjust the fixed position of a common holding member for the front lens group and the rear lens group, or may adjust the fixed positions of a connection holding member that integrally connects the holding member of the front lens group and the holding member of the rear lens group. With the image reading lens according to the embodiments of the present invention, it can achieve a high-performance image reading device that can appropriately correct a decrease in accuracy of image reading caused by the temperature change. Further, with the image reading device according to the embodiments of the present invention, it can achieve a high-performance image forming apparatus that can appropriately correct a decrease in accuracy of image reading caused by the temperature change. Hereinafter, the image reading lenses according to the first to fourth embodiments will be described in detail.

Embodiment 1

Figure 1:
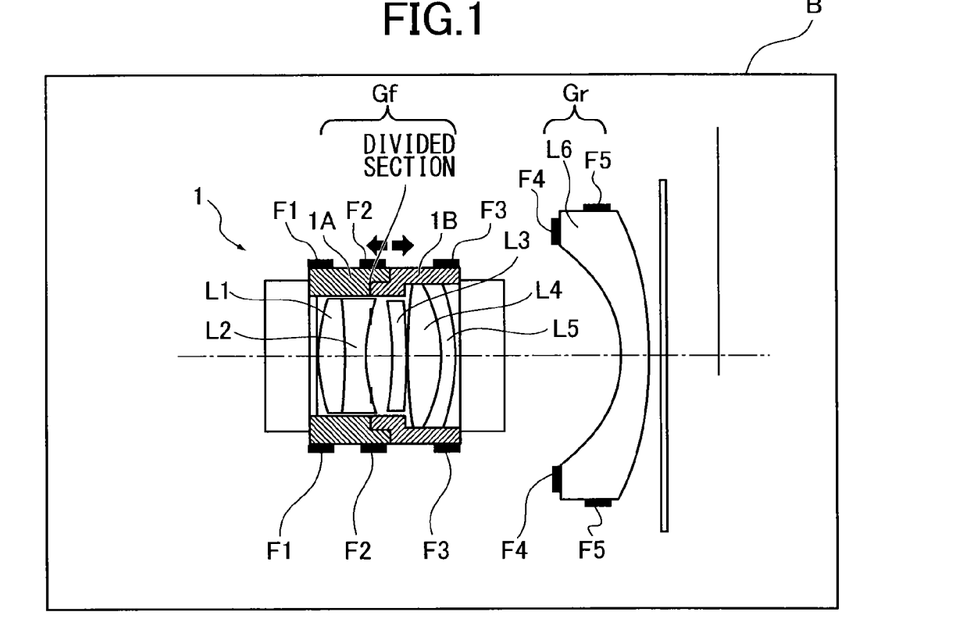
FIG. 1 is a cross-sectional view schematically illustrating a cross-sectional structure of an image reading lens according to a first embodiment of the present invention.

FIG. 1 is a cross-sectional view schematically illustrating a structure of an image reading lens according to the first embodiment of the present invention. In FIG. 1, the image reading lens 1 includes a front lens group Gf on an object side and a rear lens group Gr on an image side. The front lens group Gf includes, in order from the object side, first to fifth lenses L1 to L5. The first lens L1 and the second lens L2 are closely contacted and bonded to each other to form a cemented lens. The fourth lens L4 and the fifth lens L5 are closely contacted and bonded to each other to form a cemented lens. Here, lens types (e.g., positive lenses, negative lenses, biconvex lenses, biconcave lenses, or meniscus lenses) of the first to fifth lenses L1 to L5 should not be particularly limited in this specification. Further, although a sixth lens L6 included in the rear lens group Gr is exemplarily illustrated as a negative meniscus lens in FIG. 1, it should not be limited thereto.

The first lens L1 and the second lens L2 of the front lens group Gf are held by a first holding member 1A. The third lens L3, the fourth lens L4, and the fifth lens L5 of the front lens group Gf are held by a second holding member 1B. The first holding member 1A and the second holding member 1B are held by an independent part such as a lens holding ring, a lens holding frame, and a lens barrel. The gap between the first and second holding members 1A, 1B is adjusted by a gap adjusting mechanism. The first holding member 1A is formed of a recessed part at the end of the first holding member 1A on the image side. The second holding member 1B is formed of a convex part with a small diameter at the end of the second holding member 1B on the object side. The recessed part of the first holding member 1A is engaged with the convex part of the second holding member 1B, and they are slidable in the optical axis direction. Note that the first holding member 1A can be formed of a convex part and the second holding member 1B can be formed of a recessed part as long as the first and second holding members 1A and 1B are engaged and are slidable in the optical axis direction. Here, a supporting member to support the first holding member 1A, the second holding member 1B, and a lens holding member (not illustrated) for holding the rear lens group Gr is called a base member B. The base member B is illustrated by a rectangular frame in FIG. 1. As illustrated in FIG. 1, the first holding member 1A and second holding member 1B to hold the front lens group Gf are fixed to the base member B by any one of fixing means F1, F2, and F3. The lens holding member (not illustrated) to hold the rear lens group Gr is fixed to the base member B by fixing means F4 or F5. Accordingly spaces between the fixed positions are adjustable, thereby restraining a positional displacement of the image-forming positions caused by temperature changes. For instance, when the front lens group Gf and rear lens group Gr are respectively fixed to the base member B with the fixing means F3 and F4, the space between the fixed positions becomes narrow. On the other hand, when the front lens group Gf and rear lens group Gr are respectively fixed to the base member B with the fixing means F1 and F5, the space becomes wide. As a result, the variation of the space between the front lens group Gf and the rear lens group Gr caused by the temperature change can be adjusted. Accordingly, it is possible to adjust and correct the positional displacement of the image-forming positions. Since the first holding member 1A and the second holding member 1B, which hold the front lens group Gf, have different linear expansion coefficients from each other, the image reading lens 1 can adjust the space between the lenses with respect to the divided section of the first and second holding members 1A, 1B.

In FIG. 1, the space between the second and third lenses L2, L3 can be adjusted in accordance with the linear expansion coefficients of the first holding member 1A and the second holding member 1B when the temperature changes. When the temperature increases, the space between the second lens L2 and third lens L3 increases. By selecting the materials having appropriate linear expansion coefficients, the space between the lenses and a field curvature can be adjusted when temperature changes. In FIG. 1, the fixed positions are indicated by the fixing means F1 to F5. By changing the fixed position of the lens groups using a fixed position adjusting mechanism, the space between the front lens group Gf and the rear lens group Gr can be arbitrarily adjusted when temperature changes. Further, it can also adjust the image-forming positions.

Embodiment 2

Figure 2:
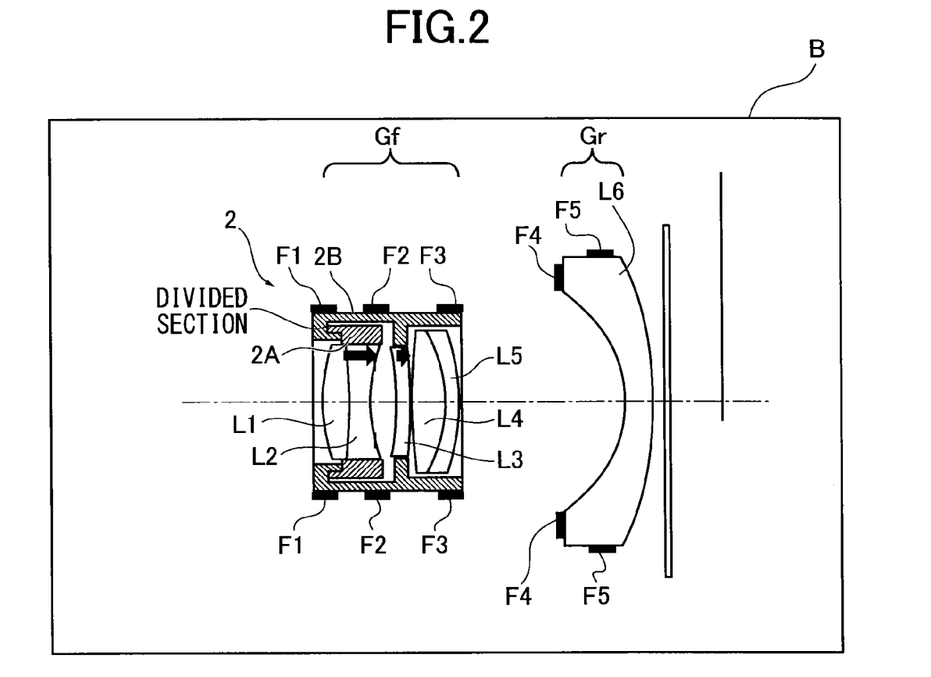
FIG. 2 is a cross-sectional view schematically illustrating a cross-sectional structure of an image reading lens according to a second embodiment of the present invention.

FIG. 2 illustrates a cross sectional view schematically illustrating a structure of an image reading lens according to the second embodiment of the present invention. In FIG. 2, the image reading lens 2 includes a front lens group Gf on an object side and a rear lens group Gr on an image side. The front lens group Gf includes, in order from the object side, first to fifth lenses L1 to L5. The first lens L1 and the second lens L2 are closely contacted and bonded to each other to form a cemented lens. The fourth lens L4 and the fifth lens L5 are closely contacted and bonded to each other to form a cemented lens. Here, lens types (e.g., positive lenses, negative lenses, biconvex lenses, biconcave lenses, or meniscus lenses) of the first to fifth lenses L1 to L5 should not be particularly limited in this specification. Further, although a sixth lens L6 included in the rear lens group Gr is exemplarily illustrated as a negative meniscus lens in FIG. 2, it should not be limited thereto.

The first lens L1 and the second lens L2 of the front lens group Gf are held by a first holding member 2A. The third lens L3, the fourth lens L4, and the fifth lens L5 of the front lens group Gf are held by a second holding member 2B. The first holding member 2A and the second holding member 2B are held by an independent part such as a lens holding ring, a lens holding frame, and a lens barrel. The gap between the first and second holding members 2A, 2B is adjusted by a gap adjusting mechanism. The first holding member 2A is formed of a recessed part at the end of the first holding member 2A on the object side. The second holding member 2B is formed of a convex part with a small diameter on the image side. The recessed part of the first holding member 2A is engaged with the convex part of the second holding member 2B, and they are slidable in the optical axis direction. Note that the first holding member 2A can be formed of a convex part and the second holding member 2B can be formed of a recessed part as long as the first and second holding members 2A and 2B are engaged and are slidable in the optical axis direction. Here, a supporting member to support the first holding member 2A, the second holding member 2B, and a lens holding member (not illustrated) for holding the rear lens group Gr is called a base member B. The base member B is illustrated by a rectangular frame in FIG. 2. As illustrated in FIG. 2, the first holding member 2A and second holding member 2B to hold the front lens group Gf are fixed to the base member B by any one of fixing means F1, F2, and F3. The lens holding member (not illustrated) to hold the rear lens group Gr is fixed to the base member B by fixing means F4 or F5. Accordingly spaces between the fixed positions are adjustable, thereby restraining a positional displacement of the image-forming positions caused by temperature changes. For instance, when the front lens group Gf and rear lens group Gr are respectively fixed to the base member B with the fixing means F3 and F4, the space between the fixed positions becomes narrow. On the other hand, when the front lens group Gf and rear lens group Gr are respectively fixed to the base member B with the fixing means F1 and F5, the space becomes wide. As a result, the variation of the space between the front lens group Gf and the rear lens group Gr caused by the temperature change can be adjusted. Accordingly, it is possible to adjust and correct the positional displacement of the image-forming positions. Since the first holding member 2A and the second holding member 2B, which hold the front lens group Gf, have different linear expansion coefficients from each other, the image reading lens 2 can adjust the space between the lenses with respect to the divided section of the first and second holding members 2A, 2B.

In FIG. 2, the space between the second and third lenses L2, L3 can be adjusted in accordance with the linear expansion coefficients of the first holding member 2A and the second holding member 2B when the temperature changes. By selecting the materials having appropriate linear expansion coefficients, the space between the lenses and a field curvature can be adjusted when temperature changes. In FIG. 2, the fixed positions are indicated by the fixing means F1 to F5. By changing the fixed position of the lens groups using a fixed position adjusting mechanism, the space between the front lens group Gf and the rear lens group Gr can be arbitrarily adjusted when temperature changes. Further, it can also adjust the image-forming positions. In the case where the linear expansion coefficient of the first holding member 2A is greater than that of the second holding member 2B, the space between the lenses decreases as the temperature increases. On the other hand, in the case where the linear expansion coefficient of the first holding member 2A is smaller than that of the second holding member 2B, the space between the lenses increases as temperature increases.

Embodiment 3

Figure 3:
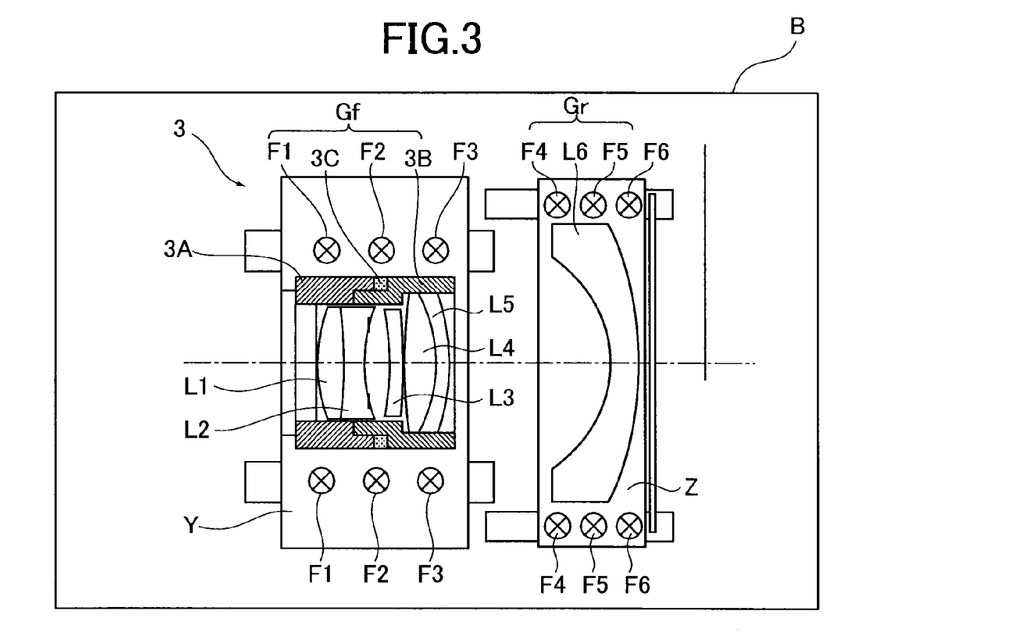
FIG. 3 is a cross-sectional view schematically illustrating a cross-sectional structure of an image reading lens according to a third embodiment of the present invention.

FIG. 3 illustrates a cross sectional view schematically illustrating a structure of an image reading lens according to the second embodiment of the present invention. In FIG. 3, the image reading lens 3 includes a front lens group Gf on an object side and a rear lens group Gr on an image side. The front lens group Gf includes, in order from the object side, first to fifth lenses L1 to L5. The first lens L1 and the second lens L2 are closely contacted and bonded to each other to form a cemented lens. The fourth lens L4 and the fifth lens L5 are closely contacted and bonded to each other to form a cemented lens. Here, lens types (e.g., positive lenses, negative lenses, biconvex lenses, biconcave lenses, or meniscus lenses) of the first to fifth lenses L1 to L5 should not be particularly limited in this specification. Further, although a sixth lens L6 included in the rear lens group Gr is exemplarily illustrated as a negative meniscus lens in FIG. 3, it should not be limited thereto.

The first lens L1 and the second lens L2 of the front lens group Gf are held by a first holding member 3A. The third lens L3, the fourth lens L4, and the fifth lens L5 of the front lens group Gf are held by a second holding member 3B. The first holding member 3A and the second holding member 3B are held by an independent part such as a lens holding ring, a lens holding frame, and a lens barrel. The gap between the first and second holding members 3A, 3B is adjusted by a gap adjusting mechanism. The first holding member 3A is formed of a recessed part at the end of the first holding member 3A on the image side. The second holding member 3B is formed of a convex part with a small diameter at the end of the second holding member 3B on the object side. The recessed part of the first holding member 3A is engaged with the convex part of the second holding member 3B and an inserting member 3C is inserted to the engaged part. The first holding member 3A and the second holding member 3B are slidable in the optical axis direction. Note that the first holding member 3A can be formed of a convex part and the second holding member 3B can be formed of a recessed part as long as the first and second holding members 3A and 3B are engaged and are slidable in the optical axis direction. Here, a supporting member to support the first holding member 3A, the second holding member 3B, and a lens holding member (not illustrated) for holding the rear lens group Gr is called a base member B. The base member B is illustrated by a rectangular frame in FIG. 3. A holding member to support the first holding member 3A and the second holding member 3B is called a front group holding member Y. A holding member to hold the rear lens group Gr is called a rear group holding member Z. The first holding member 3A and the second holding member 3B are fixed to the front group holding member Y, and a holding member (not illustrated) of the rear lens group Gr is fixed to the rear group holding member Z. From the fixing means F1 to F6, by appropriately selecting the fixed positions of the front group holding member Y and rear group holding member Z with respect to the base member B, the spaces between the first holding member 3A and second holding member 3B and between the front lens group Gf and rear lens group Gr become adjustable. Note that the materials for the front group holding member Y and for rear group holding member Z must be different from that of the base member B, i.e., the linear expansion coefficient thereof must be different from that of the base member B. Further, the inserting member 3C has a different linear expansion coefficient from the first and second holding members 3A, 3B, and by having the inserting member 3C between the first holding member 3A and second holding member 3B, which hold the front lens group Gf; the image reading lens 3 can adjust the space between the lenses with respect to the divided section of the first and second holding members 3A, 3B. In this structure, the first holding member 3A and the second holding member 3B may have the same linear expansion coefficient or may have different linear expansion coefficients from each other.

In FIG. 3, the space between the second and third lenses L2, L3 can be adjusted in accordance with the linear expansion coefficient and thickness of the inserting member 3C when the temperature changes. When the temperature increases, the space between the second lens L2 and third lens L3 increases. By selecting an inserting member having appropriate linear expansion coefficient and thickness, the space between the lenses and a field curvature can be adjusted when temperature changes. FIG. 3 shows the fixed positions of the fixing means F1 to F6 with respect to a connection holding member that integrally connect the holding members of each lens group Gf, Gr. When the linear expansion coefficients of the first and second holding members 3A and 3B are different from that of the connection holding member (not illustrated) that integrally connect the first and second holding members 3A and 3B, the fixed positions of the first holding member 3A and second holding member 3B are changed in response to temperature changes with respect to the connection holding member. As a result, without changing the fixed positions of each group, the space between the front lens group Gf and the rear lens group Gr can be arbitrarily adjusted when temperature changes. Further, it can also adjust the image-forming positions.

Embodiment 4

Figure 4:
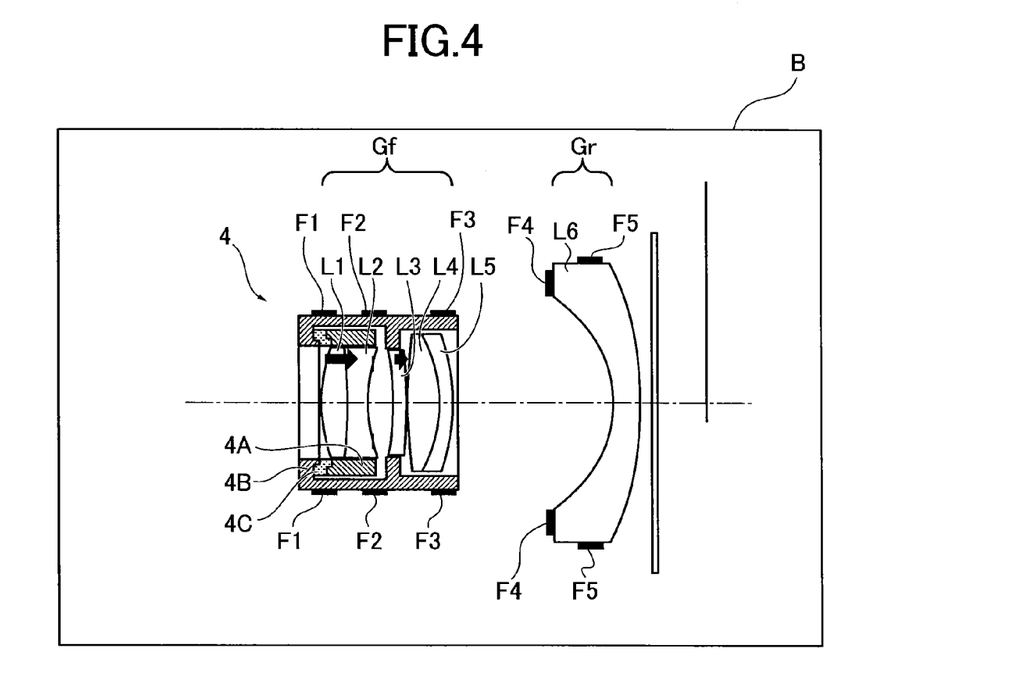
FIG. 4 is a cross-sectional view schematically illustrating a cross-sectional structure of an image reading lens according to a fourth embodiment of the present invention.

FIG. 4 is a cross-sectional view schematically illustrating a cross-sectional structure of an image reading lens according to the fourth embodiment of the present invention. In FIG. 4, the image reading lens 4 includes a front lens group Gf on an object side and a rear lens group Gr on an image side. The front lens group Gf includes, in order from the object side, first to fifth lenses L1 to L5. The first lens L1 and the second lens L2 are closely contacted and bonded to each other to form a cemented lens. The fourth lens L4 and the fifth lens L5 are closely contacted and bonded to each other to form a cemented lens. Here, lens types (e.g., positive lenses, negative lenses, biconvex lenses, biconcave lenses, or meniscus lenses) of the first to fifth lenses L1 to L5 should not be particularly limited in this specification. Further, although a sixth lens L6 included in the rear lens group Gr is exemplarily illustrated as a negative meniscus lens in FIG. 4, it should not be limited thereto.

The first lens L1 and the second lens L2 of the front lens group Gf are held by a first holding member 4A. The third lens L3, the fourth lens L4, and the fifth lens L5 of the front lens group Gf are held by a second holding member 4B. The first holding member 4A and the second holding member 4B may be configured with an independent part such as a lens holding ring, a lens holding frame, and a lens barrel. The first holding member 4A is formed of a recessed part at the end of the first holding member 4A on the object side. The second holding member 4B is formed of a convex part with a small diameter at the end of the second holding member 4B on the image side. The recessed part of the first holding member 4A is engaged with the convex part of the second holding member 4B and an inserting member 4C is inserted to the engaged part as an adjustment part. The first holding member 4A and the second holding member 4B are slidable in the optical axis direction together with the inserting member 4C. Note that the first holding member 4A can be formed of a convex part and the second holding member 4B can be formed of a recessed part as long as the first and second holding members 4A and 4B are engaged and are slidable in the optical axis direction. Here, a supporting member to support the first holding member 4A, the second holding member 4B, and a lens holding member (not illustrated) for holding the rear lens group Gr is called a base member B. The base member B is illustrated by a rectangular frame in FIG. 4. As illustrated in FIG. 4, the first holding member 4A and second holding member 4B to hold the front lens group Gf are fixed to the base member B by any one of fixing means F1, F2, and F3. A lens holding member (not illustrated) to hold the rear lens group Gr is fixed to the base member B by fixing means F4 or F5. Accordingly spaces between the fixed positions are adjustable, thereby restraining a positional displacement of the image-forming positions caused by temperature changes. For instance, when the front lens group Gf and rear lens group Gr are respectively fixed to the base member B with the fixing means F3 and F4, the space between the fixed positions becomes narrow. On the other hand, when the front lens group Gf and rear lens group Gr are respectively fixed to the base member B with the fixing means F1 and F5, the space becomes wide. As a result, the variation of the space between the front lens group Gf and the rear lens group Gr caused by the temperature changes can be adjusted. Accordingly, it is possible to adjust and correct the positional displacement of the image-forming positions. Further, the inserting member 4C has a different linear expansion coefficient from the first and second holding members 4A, 4B, and by having the inserting member 3C between the first holding member 4A and second holding member 4B, which hold the front lens group Gf; the image reading lens 4 can adjust the space between the lenses with respect to the divided section of the first and second holding members 4A, 4B. In this structure, the first holding member 4A and the second holding member 4B may have the same linear expansion coefficient or may have different linear expansion coefficients from each other.

Embodiment 5

Figure 5:
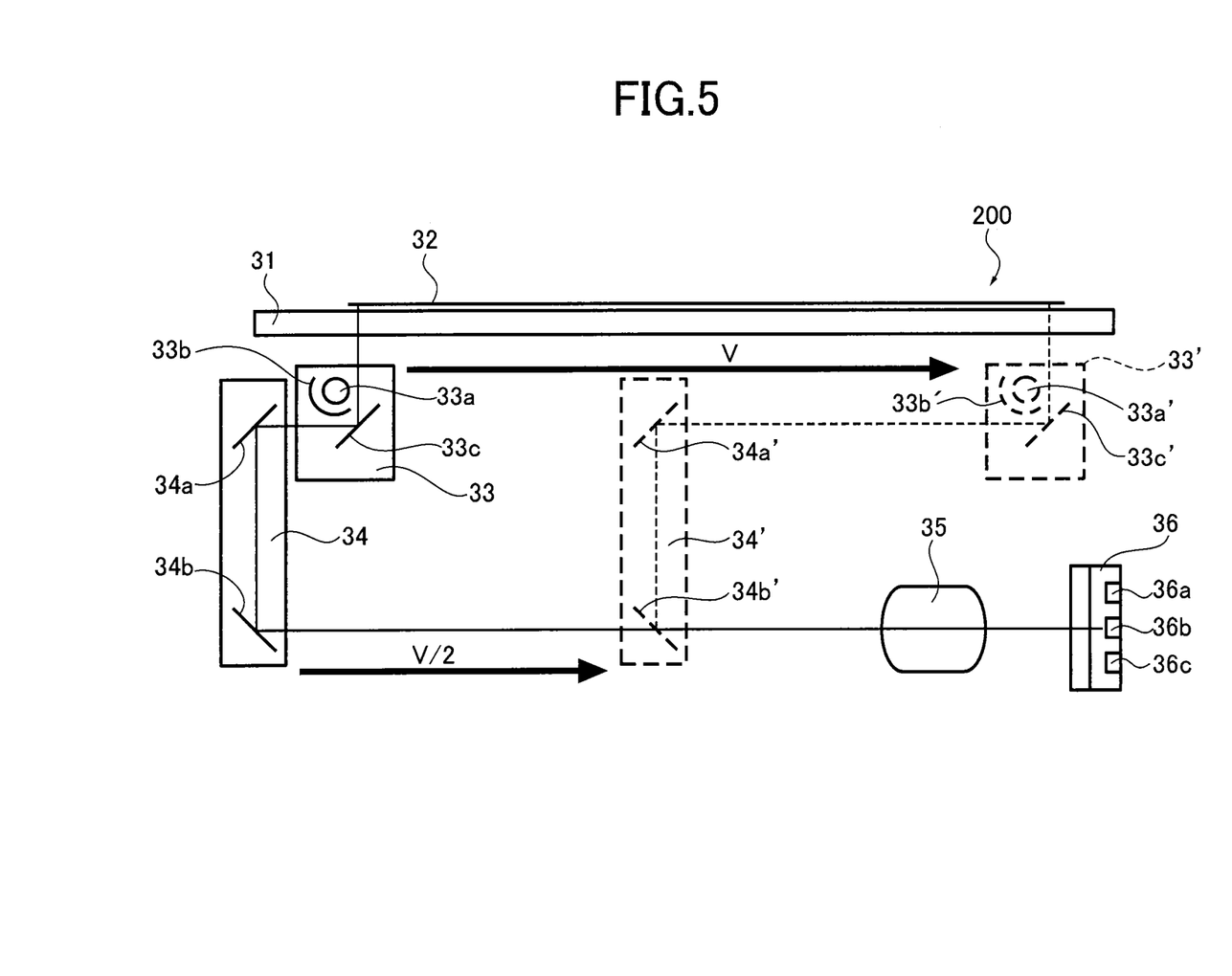
FIG. 5 is a cross-sectional view schematically illustrating a cross-sectional structure of an image reading device according to a fifth embodiment of the present invention.

Next, an image reading device according to a fifth embodiment of the present invention will be described. FIG. 5 is a cross-sectional view schematically illustrating a cross-sectional structure of the image reading device according to the fifth embodiment. The image reading device is installed with the image reading lens according to any one of the first to fourth embodiments as an image-forming lens. An image reading device 200 illustrated in FIG. 5 includes a contact glass 31, a first carriage 33, a second carriage 34, an image reading lens 35, and a line sensor 36 consisting of image pickup elements. The first carriage 33 includes an illumination light source 33a, a light-source mirror 33b, and a first mirror 33c. The second carriage 34 includes a second mirror 34a and a third mirror 34b. The line sensor 36 includes red (R), green (G), and blue (B) filters as color separation means. The line sensor 36 further includes photoelectric conversion elements 36a, 36b, 36c arranged in three lines on a single chip so as to configure a three-line CCD sensor. The image reading lens 35 is any one of the image reading lenses according to the first to fourth embodiments.

In FIG. 5, an original document 32, on which an image to be read is printed or drawn, is placed on the contact glass 31 (a flat document plate). The first carriage 33 disposed below the contact glass 31 holds the illumination light source 33a, the light-source mirror 33b, and the first mirror 33c and moves from the position indicated by the reference number 33 to the number 33' at a constant speed V. Here, the illumination light source 33a, the light-source mirror 33b, and the first mirror 33c are all extended toward an orthogonal direction to the paper surface. I.e., the illumination light source 33a is a longitudinal light source. As the illumination light source 33a, a halogen lamp, a xenon (Xe) lamp, or a fluorescent lamp of a cold-cathode tube may be used. Further, point light sources (e.g., Light-Emitted Diodes (LED)) arranged in a line, a liner light source having point light sources with a light guide body, or a surface emission light source such as an organic electroluminescent (EL) with an elongated shape may be used as the illumination light source 33a. The illumination light source 33a is controlled to emit light when the first carriage 33 moves toward the right side on the paper surface of FIG. 5. The light emitted from the illumination light source 33a is guided by the light-source mirror 33b having a half-cylindrical shape extending toward the orthogonal direction to the paper surface of FIG. 5, such that the illumination light source 33a illuminates slit parts extending in the main scanning direction (i.e., the orthogonal direction to the paper surface of FIG. 5) for the original document 32 placed on the contact glass 31.

The first mirror 33c is held on the first carriage 33 such that a mirror surface of the first mirror 33c is tilted by 45 degree against the document placement surface of the contact glass 31. The second carriage 34 is extended in the orthogonal direction to the paper surface of FIG. 5 and holds the second mirror 34a and the third mirror 34b. The mirror surfaces of the second and third mirrors 34a, 34b are opposed to each other and perpendicularly arranged. The second carriage 34 moves to the position indicated by the reference number 34' at a constant speed V/2 (i.e., at one-half of the speed of the first carriage 33) in synchronization with the movement of the first carriage 33. The reflected light from the original document 32 (light reflected by the image on the document) is reflected by the first mirror 33c installed in the first carriage 33. The reflected light is then further reflected by the second mirror 34a and the third mirror 34b of the second carriage 34 so as to enter the image reading lens 35. As a result, a reduced optical image of the original document is formed on the imaging surface (input surface) of the line sensor 36 by the image reading lens 35 through a cover glass of the line sensor 36 (image pickup element).

To be specific, the first mirror 33c, the second mirror 34a, and the third mirror 34b configure a catoptric system. The first carriage 33 and the second carriage 34 are moved by driving means (not illustrated) toward the direction indicated by arrows (right direction on the paper surface). When the moving speed of the first carriage 33 is V, the moving speed of the second carriage is V/2. That is, when the first carriage 33 moves a certain distance, the second carriage 34 moves the half of the certain distance. The first and second carriages 33, 34 can move to the position illustrated by the dash lines. The illumination light source 33a, the light-source mirror 33b, and the first mirror 33c are moved integrally with the first carriage 33 so as to illuminate and scan the whole part of the original document 32 placed on the contact glass 31. As described above, since the moving speed ratio of the first and second carriages 33, 34 is V:V=2:1, the length of the optical path from the illuminated and scanned part of the original document 32 to the image reading lens 35 substantially remains constant. The line sensor 36 used as the image pickup sensor is the three-line CCD sensor having the photoelectric conversion elements 36a, 36b, 36c arranged in three lines on the single chip. The photoelectric conversion elements 36a, 36b, 36c have the red (R) filter, green (G) filter, and blue (B) filter respectively as the color separation means. The line sensor 36 generates signals in accordance with the original image as scanning the original document 32. As described the original document 32 is read by the device 200, and the color image on the original document 32 is color-separated into the three primary colors (i.e., red, green, and blue) to read.

The image reading device 200 is a device to read images in full color and includes the color separation means, which is installed with the red (R) filter, green (G) filter, and blue (B) filter into the line sensor 36, on the image-forming optical path of the image reading lens 35. As described above, the image-forming light flux entered into the image reading lens 35 forms the reduced image of the original document 32 on the light-receiving surface of the line sensor 36 (image pickup sensor) with an image-forming action. Here, the line sensor 36 is a CCD line sensor and has small photoelectric conversion parts closely arranged in the orthogonal direction to the paper surface of FIG. 5 such that the line sensor 36 generates an electrical signal for each pixel of the original image as illuminating and scanning the original document 32. The line sensor 36 reads the color information of the formed image by color-separating the image into three colors (red, green and blue), and combines the electronic signals converted (generated) by the photoelectric conversion parts of each color to read the colored original document. The electronic signals are converted into image signals through signal processing such as A/D conversion and are stored into a memory (not illustrated) if needed. By applying the image reading lens according to any one of the first to fourth embodiments into the image reading device 200, it becomes possible to downsize the image reading device.

Here, a method of color separation should not be limited to the above-mentioned method. For instance, the image reading device 200 may selectively include a color-separation prism or a filter between the image reading lens and the line sensor to color-separate the image into red (R), green (G), and blue (B). Further, the device 200 may include a red (R) light source, a green (G) light source, and a blue (B) light source and sequentially light up the light sources to illuminate the original document. As described above, the image reading device according to the fifth embodiment of the present invention uses the image reading lens according to any one of the first to fourth embodiments. The image reading device may include a color-separating function on the image-forming optical path to read the original document in full color.

Embodiment 6

Figure 6:
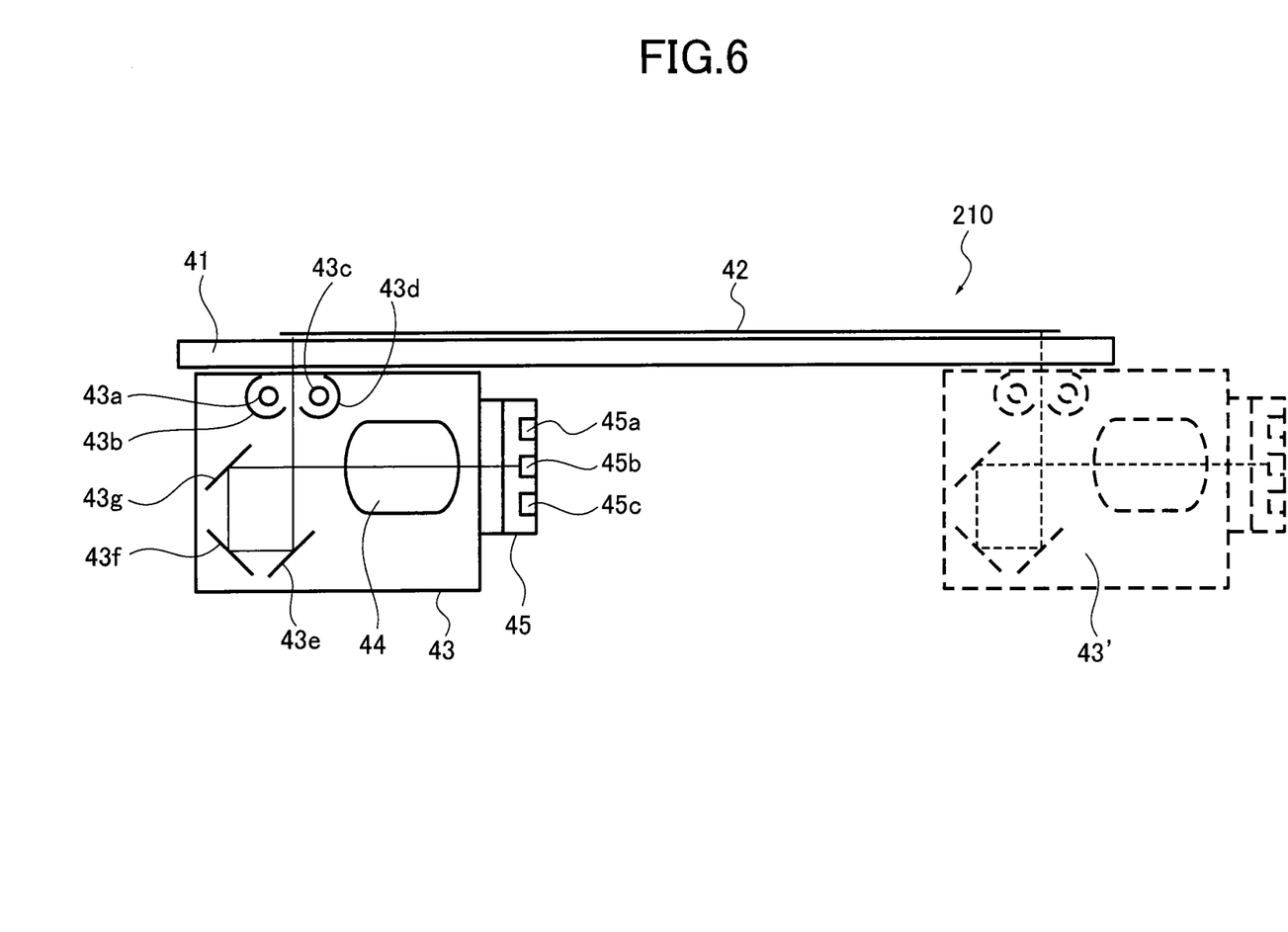
FIG. 6 is a cross-sectional view schematically illustrating a cross-sectional structure of an image reading device according to a sixth embodiment of the present invention.

Next, an image reading device according to a sixth embodiment will be described with reference to FIG. 6. The image reading device of the sixth embodiment includes an image reading unit and scans an original document by moving the image reading unit along the original document using driving means. Here, the image reading unit integrally includes illumination means to illuminate the original document placed on a contact glass, a line sensor, a plurality of mirrors forming an image-forming optical path from the illuminated part of the original document to the line sensor, and an image reading lens disposed on the image-forming optical path. Specifically, the image reading device according to the sixth embodiment is configured by using the image reading lens according to the first embodiment as an image-forming lens. FIG. 6 is a cross-sectional view schematically illustrating a cross-sectional structure of the image reading device according to the sixth embodiment of the present invention. The image reading device of the sixth embodiment is installed with the image reading lens according to any one of the first to fourth embodiments as an image-forming lens.

The image reading device 210 illustrated in FIG. 6 includes a contact glass 41, an image reading unit 43, an image reading lens 44, and a line sensor 45. The image reading unit 43 has a first illumination light source 43a, a first light-source mirror 43b, a second illumination light source 43c, a second light-source mirror 43d, a first mirror 43e, a second mirror 43f, and a third mirror 43g. The line sensor 45 includes red (R), green (G), and blue (B) filters as color separation means. The line sensor 36 further includes photoelectric conversion elements 45a, 45b, 45c arranged in three lines on a single chip so as to configure a three-line CCD sensor. The image reading lens 44 is any one of the image reading lenses according to the first to fourth embodiments. In FIG. 6, an original document 42, on which an image to be read is printed or drawn, is placed on the contact glass 41 (a flat document plate). The image reading unit 43 is disposed below the contact glass 31 and holds the first illumination light source 43a, the first light-source mirror 43b, the second illumination light source 43c, the second light-source mirror 43d, the first mirror 43e, the second mirror 43f, and the third mirror 43g. Here, the illumination light source 43a, the first light-source mirror 43b, the second illumination light source 43c, the second light-source mirror 43d, the first mirror 43e, the second mirror 43f, and the third mirror 43g are all extended toward an orthogonal direction to the paper surface. The image reading lens 44 and the line sensor 45 are integrally provided with the image reading unit 43.

The first and second illumination light sources 43a, 43c are longitudinal light sources extending toward the orthogonal direction to the paper surface. Similar to the illumination light source 33a of FIG. 5, the first and second illumination light sources 43a, 43c may be a halogen lamp, a xenon (Xe) lamp, or a fluorescent lamp of a cold-cathode tube. Further, point light sources (e.g., Light-Emitted Diodes (LED)) arranged in a line, a liner light source having point light sources with a light guide body, or a surface emission light source such as an organic electroluminescent (EL) with an elongated shape may be used as the first and second illumination light sources 43a, 43c. The first and second illumination light sources 43a, 43c are controlled to emit light when the image reading unit 43 is moved toward the right side on the paper surface of FIG. 6. The light emitted from the first and second illumination light sources 43a, 43c is guided by the first and second light-source mirror 43b, 43d each having a half-cylindrical shape extending toward the orthogonal direction to the paper surface of FIG. 6, such that the first and second illumination light sources 43a, 43c illuminate slit parts extending in the main scanning direction (i.e., the orthogonal direction to the paper surface of FIG. 6) for the original document 42 placed on the contact glass 41.

The first, second, and third mirrors 43e, 43f, 43g are extended in the orthogonal direction to the paper surface of FIG. 6, and are held on the image reading unit 43 such that the mirror surfaces of the first, second, and third mirrors 43e, 43f, 43g are tilted by 45 degree against the document placement surface of the contact glass 41. Further, the mirror surfaces are opposed to each other and perpendicularly arranged. When the image reading unit 43 moves from the position illustrated in FIG. 6 to the position indicated by the reference number 43' at a constant speed, reflected light from the original document 42 (light reflected by the image on the document) is sequentially reflected by the first mirror 43e, the second mirror 43f, and the third mirror 43g disposed on the image reading unit 43. The reflected light is then enters the image reading lens 44. As a result, a reduced optical image of the original document is formed on the imaging surface (input surface) of the line sensor 45 by the image reading lens 44 through a cover glass of the line sensor 45 (image pickup element). To be specific, the first, second, and third mirrors 43e, 43f, 43g configure a catoptric system. The image reading unit 43 is moved by driving means (not illustrated) toward the right direction of the paper surface of FIG. 5.

Accordingly, the original document 42 is illuminated and scanned while the image reading unit 43 is moves to the position indicated by the reference number 43'. When the original document 42 is illuminated and scanned, the reflected light of the illumination light from the original document 42 is further reflected by the first, second, and third mirrors 43e, 43f, 43g and enters into the image reading lens 44 as an image-forming light flux. Since the first, second, and third mirrors 43e, 43f, 43g are all integrally held by the image reading unit 43, the length of the optical path from the illuminated part of the original document 42 to the image reading lens 44 remains constant when illuminating and scanning the original document 42. The image-forming light flux entered into the image reading lens 44 forms the reduced image of the original document 42 on the light-receiving surface of the line sensor 45 (image pickup sensor) with an image-forming action. Here, the image formed on the light-receiving surface of the line sensor 45 is converted into electronic signals and used to read information of the original document in the same manner as the image reading device 200 of the fifth embodiment.

Embodiment 7

Figure 7:
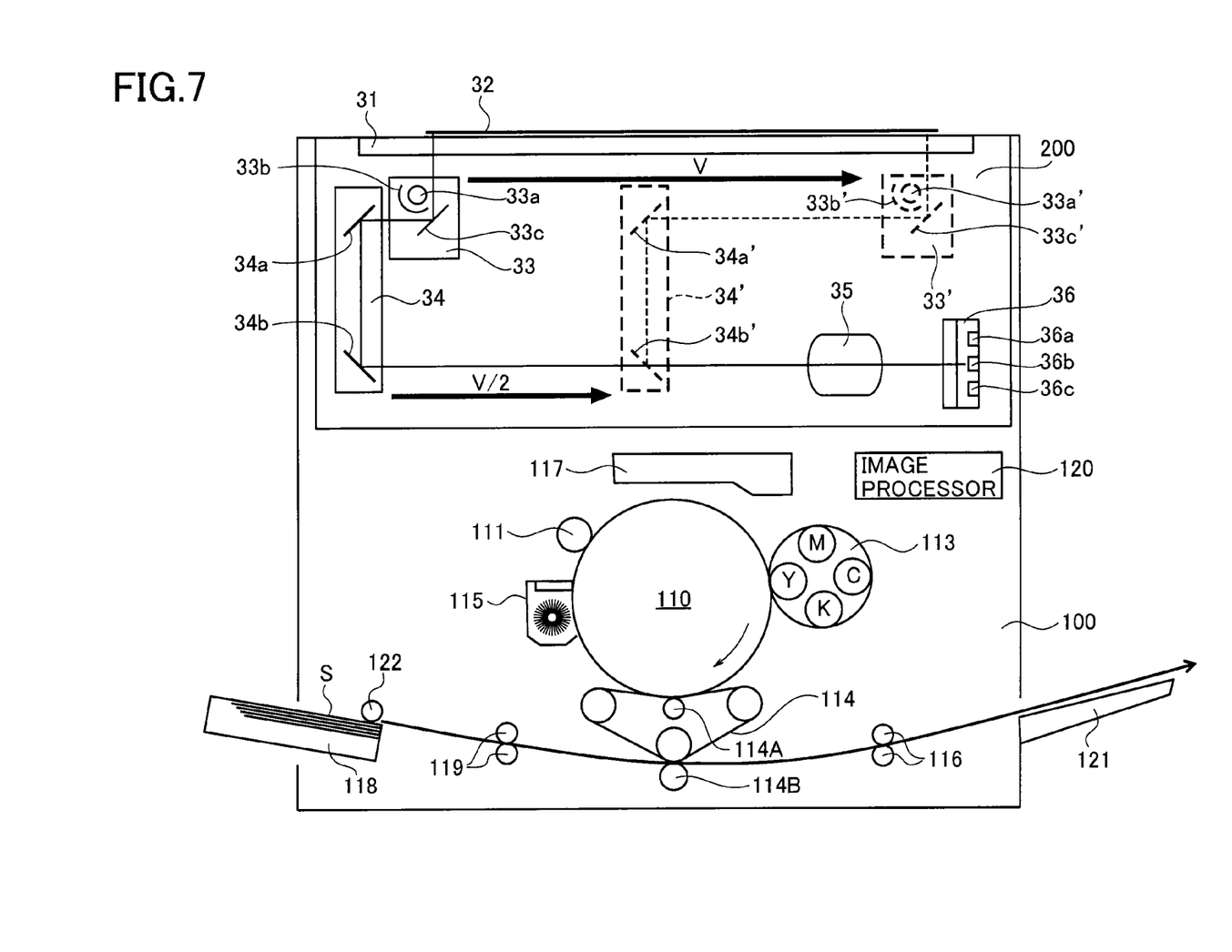
FIG. 7 is a cross-sectional view schematically illustrating a cross-sectional structure of an image forming apparatus according to a seventh embodiment of the present invention.

Next, an image forming apparatus of a seventh embodiment includes the image reading device according to the fifth embodiment or the sixth embodiment will be described with reference to FIG. 7. FIG. 7 is a cross-sectional view schematically illustrating a cross-sectional structure of the image forming apparatus according to the seventh embodiment of the present invention. The image forming apparatus illustrated in FIG. 7 includes an image reading device 200 and an image forming part 100. Since the image reading device 200 has the similar configuration to that illustrated in FIG. 5, the same components are indicated by the same reference numbers and the detailed explanation thereof will be omitted.

The image reading lens 35 uses any one of the image reading lenses according to the first to fourth embodiments. Note that the image reading device may be configured to include an image reading unit and scan the original document by moving the image reading unit along the original document using driving means. Here, the image reading unit integrally includes illumination means to illuminate the original document in a slit-like shape, a line sensor, a plurality of mirrors forming an image-forming optical path from the illuminated part of the original document to the line sensor, and an image reading lens disposed on the image-forming optical path. In other words, the image forming apparatus may use the image reading device according to the sixth embodiment (illustrated in FIG. 6) instead of the image reading device according to the fifth embodiment (illustrated in FIG. 5). The image forming part 100 is disposed below the image reading device 200 and includes a photoconductor 110, a charging roller 111, a developing device 113, a transfer belt 114, a cleaning device 115, a fixing device 116, an optical scanner 117, a cassette 118, a pair of registration rollers 119, an image processor 120, a tray 121, and a paper feeding roller 122. The transfer belt 114 includes a transfer-voltage applying roller 114A and a transfer roller 114B.

In FIG. 7, the image signals output from the line sensor 36 of the image reading device 200 arranged in three lines are input to the image processor 120 of the image forming part 100. The image processor 120 then converts the image signals into writing signals to write or draw each color (to be specific, yellow (Y), magenta (M), cyan (C), and black (K)). The image forming part 100 includes the photoconductor 110 (latent image bearer) having photoconductivity and formed in a cylindrical shape. Further, the image forming part 100 includes charging roller 111 (charging means), the turret type developing device 113, transfer belt 114, and the cleaning device 115 around the photoconductor 110. Note that as the charging means, the image forming part 100 can include a corona charger instead of the charging roller 111. The optical scanner 117 receives the writing signals from the image processor 120 and performs writing process to the photoconductor 110 by the optical scanning. The optical scanner 117 performs the optical scanning on the photoconductor 110 in between the charging roller 111 and the developing device 113. When forming an image, the photoconductor 110 is rotated clockwise at a constant speed to charge the surface of the photoconductor 110 uniformly by the charging roller 11 so as to form an electrostatic latent image by receiving exposure of the optical writing using a laser beam from the optical scanner 117. The formed electrostatic latent image is a negative latent image, i.e., the image area is exposed.

Along the rotation of the photoconductor 110, the image is sequentially written from yellow (Y), magenta (M), cyan, (C), and black (K) images. The electrostatic latent image is converted to a visible positive image by performing reversal development using developing units Y (which develops the image with the yellow toner), M (which develops the image with the magenta toner), C (which develops the image with the cyan toner), and K (which develops the image with the black toner) of the turret type developing device 113. The toner image of each color is respectively transferred to the transfer belt 114 by the transfer-voltage applying roller 114A. As a result, a color image is developed by combining the each color image on the transfer belt 114. The cassette 118 storing transfer papers S (recording medium) is detachably connected to the image forming apparatus. The topmost transfer paper S in the cassette 118 is fed by the paper feeding roller 122, and the pair of registration rollers 119 sandwiches the fed transfer paper S. The pair of registration rollers 119 sends the transfer paper S to a transferring section when the color image on the transfer belt 114 comes to the transferring position. The transfer paper S is, therefore, superimposed to the color image in the transferring section, and the color image is electrostatically transferred to the transfer paper S by the transfer roller 114B. The transfer roller 114B presses and transfers the color image on the transfer paper S.

The transfer paper S on which the color image has been transferred is sent to the fixing device 116 to fix the color image. The transfer paper S is then passed through a conveyance path by guide means (not illustrated) and ejected onto the tray 121 by a pair of paper ejection rollers (not illustrated). Each time the image of each color toner is transferred, the surface of the photoconductor 110 is cleaned by the cleaning device 115 to remove residual toner and paper dust. Note that the image forming apparatus according to the seventh embodiment of the present invention should not be limited to the apparatus to form only color images. The image forming apparatus is configured to form not only color images but also monochrome images. Further, by applying the image reading device using the image reading lens according to the embodiments of the present invention into a space-saving image forming apparatus (in which a tray is disposed between the image reading device and image forming part so as to configure an in-body paper ejection type apparatus), it becomes possible to provide a thin image reading device. Consequently, it can have a wide space between the image reading device and the image forming part and enhance the visibility of the output papers, resulting in facilitating the work of the operator. Note that although all lenses have a circular shape in the above explanation, they should not be limited thereto. For instance, oval-shaped lenses, which have the top and bottom parts cut, may be used to in the image reading lens to reduce the height of the image reading device.

As described above, the image reading lens to read an original document includes a first correcting mechanism that corrects a field curvature at a first correction part when temperature changes, and a second correcting mechanism that corrects an image-forming position when the temperature changes. The second correcting mechanism corrects the image-forming position at a part where a positional displacement of the image-forming position caused by a change of a lens interval is greater and a variation of the field curvature is smaller than the first correction part. With this, it becomes possible to appropriately correct a positional displacement of the image-forming position and variation of the field curvature caused by the temperature change, thereby enabling of providing a high quality image reading lens.

Here, it is preferable for each first correcting member and the second correcting member to perform the correction by moving at least one lens in the optical axis direction. With this, it becomes possible to achieve a high-performance image reading lens that can correct the change of the field curvature caused by a temperature change. It is further preferable to dispose the front lens group on the object side and the rear lens group on the image side, to held the front lens group by two holding members, and to correct the field curvatures caused by temperature change using the two holding members. With this, it becomes possible to achieve a high-performance image reading lens that can correct the field curvatures caused by temperature change. It is further preferable to insert an adjusting member between the two holding members. Here, the adjusting member has a different linear expansion coefficient. With this, it becomes possible to achieve a high-performance image reading lens that can correct the field curvatures caused by temperature change. It is further preferable to configure such that the two holding members are configured to be the adjusting member having the different linear coefficient. With this, it becomes possible to achieve a high-performance image reading lens that can correct the field curvatures caused by temperature change.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An image reading lens, comprising:
    a plurality of lenses;
    a first correcting mechanism that corrects a field curvature at a first correction part when temperature changes; and
    a second correcting mechanism that corrects an image-forming position when the temperature changes, wherein
    the second correcting mechanism corrects the image-forming position at a part where a positional displacement of the image-forming position caused by a change of a lens interval is greater and a variation of the field curvature caused by the change of the lens interval is smaller than the first correction part.

2. The image reading lens according to claim 1, wherein the first correcting mechanism and the second correcting mechanism correct the field curvature and the image-forming position by respectively moving at least one of the lenses along an optical axis of the image reading lens.

3. The image reading lens according to claim 1, further comprising:
a front lens group disposed on an object side; and
a rear lens group disposed on an image side, wherein
the front lens group is held by two holding members, and
the first correcting mechanism corrects the field curvature using the two holding members when the temperature changes.

4. The image reading lens according to claim 3, further comprising:
an adjusting member inserted between the two holding members, the adjusting member having a different linear expansion coefficient from linear expansion coefficients of the two holding members.

5. The image reading lens according to claim 3, wherein the two holding members have different linear expansion coefficients from each other.

6. The image reading lens according to claim 3, further comprising:
a fixed position adjusting mechanism that adjusts fixed positions of the front lens group and the rear lens group, wherein
the second correcting mechanism corrects the image-forming position in between the front lens group and the rear lens group when the temperature changes.

7. An image reading device comprising the image reading lens according to claim 1.

8. An image forming apparatus comprising the image reading device according to claim 7.

* * * * *